Dec. 6, 1960    J. WARREN    2,962,927
COMBINATION OF MOVIE PROJECTOR AND SOUND RECORDER
REPRODUCER AND A CASE WITH SOUND
RECORDER AND REPRODUCER
Filed April 25, 1955
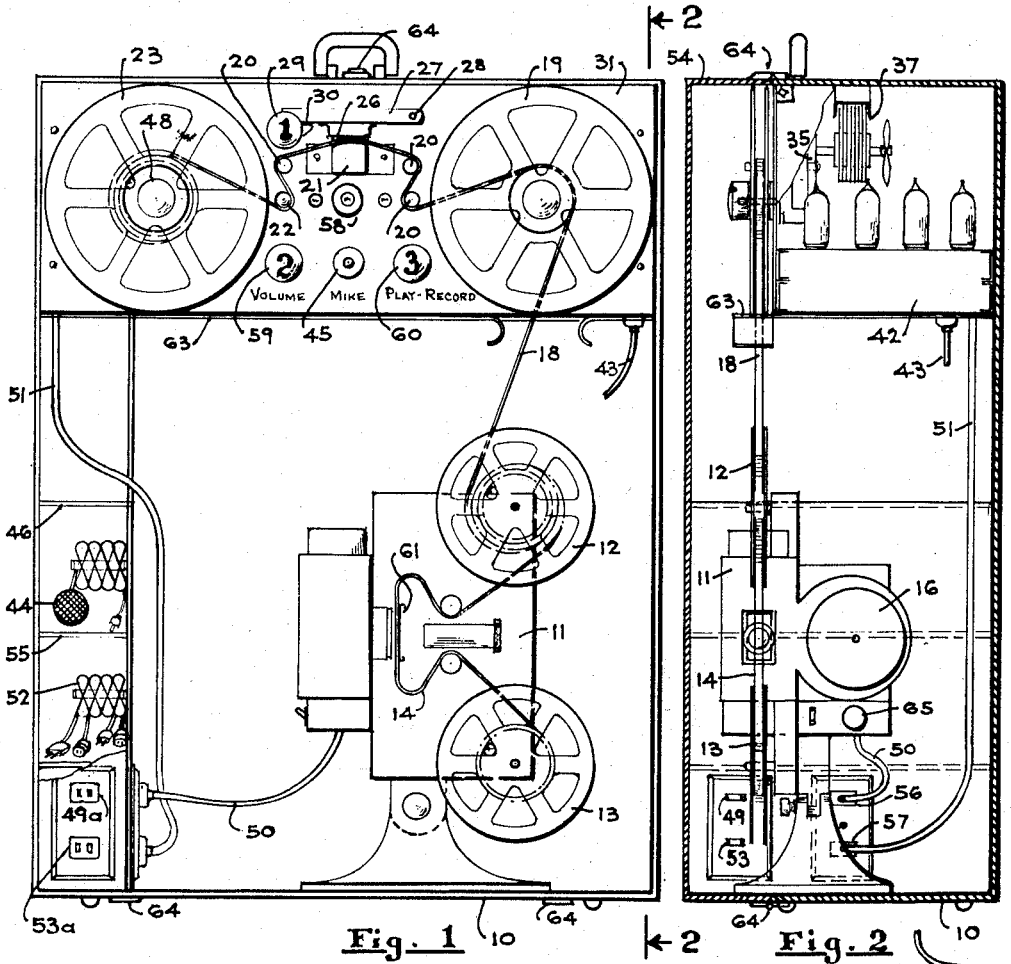
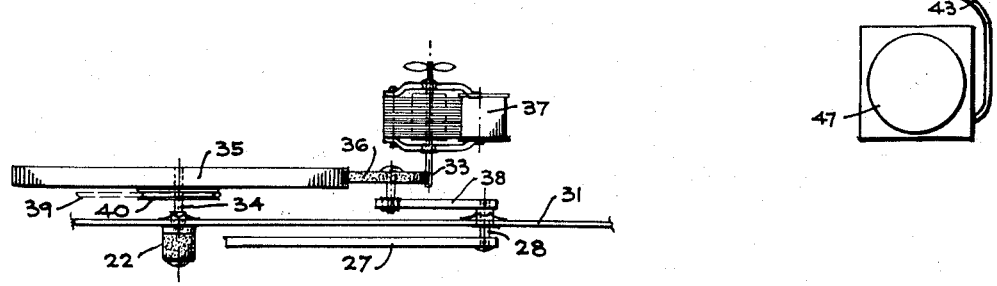
Fig. 3
INVENTOR.
Jack Warren
BY
Bohleber, Jassett & Montstream
ATTORNEYS United States Patent Office 2,962,927
Patented Dec. 6, 1960

2,962,927

COMBINATION OF MOVIE PROJECTOR AND SOUND RECORDER REPRODUCER AND A CASE WITH SOUND RECORDER AND REPRODUCER

Jack Warren, River Edge, N.J.

Filed Apr. 25, 1955, Ser. No. 503,657

12 Claims. (Cl. 88—16.2)

The invention relates to a combination of a movie projector and a magnetic tape sound recorder and reproducer so that sound accompanies the projection of the movie film. The sound recorder and reproducer, however, is an independent unit so that it can be used independently for recording and reproducing sound unassociated with a film. Since the sound recorder and reproducer may be used with any movie projector, the invention also relates to a case and sound recorder and reproducer modified so that it can cooperate with a movie projector in the case below the sound recorder and reproducer. The invention is usable with both 8 mm. and 16 mm. projectors and is designed for amateur home use as well as commercial use such as in the sales of products, services, and the like.

The invention has as an object the synchronizing of the sound and picture by means of combining a separate movie film and sound tape together on a common spool or reel.

It is an object of the invention to produce a combination of movie projector and sound recorder and reproducer which is inexpensive so far as equipment is concerned as well as with respect to film and sound track, and can be readily handled by the amateur.

Another object is to construct a combination of movie projector and sound recorder and reproducer in which a magnetic sound tape and the movie film are separate units and are wound together on a common reel or spool. The movie film is processed after exposure in the usual manner and the sound record may be made separately while viewing the processed film.

A further object is to provide a combination of movie projector and sound recorder and reproducer in which the latter is separately operable for the taking of a movie and sound at the same time by means of the separate devices, thereby obtaining original sounds at the time the movie is being taken at the same speed.

A still further object is to construct a combination of movie projector and sound recorder and reproducer, or of a case with a sound recorder and reproducer modified to cooperate with a projector therebelow, which uses separate film and sound tape whereby the film can be edited by cutting or adding and the sound tape may also be edited by cutting, or by wiping off the magnetic sounds with a magnet, and adding without affecting the other as would occur when the sound record is on the film.

Other objects of the invention will be more apparent from the following description when taken in connection with the accompanying drawings illustrating a preferred embodiment thereof in which:

Fig. 1 is a side elevation of the combination of sound recorder and movie projector in its case with the side panel removed.

Fig. 2 is a front view of the combination with a section through the case taken on line 2—2 of Fig. 1, and Fig. 3 is an enlarged detail view of the drive means for the sound recording tape.

Sound recording with movie film is presently accomplished by having a sound track on the face at an edge of the movie film which requires special skill in making the recording, and requires special handling in the development of the film and providing the sound track. Since sound on film is special, it is usually relatively expensive and difficult to process as compared to the usual separate movie film without a sound track and separate commercial magnetic sound tape.

The combination of movie projector and sound reproducer and recorder are mounted in a case 10 of any suitable construction but which mounts the sound mechanism in a vertical plane and above the projector. A movie projector 11 of any suitable type is placed in a chamber at the bottom of the case and it has an upper supply or wind-off reel 12 and a lower take-up or wind-up reel 13. The movie projector may be either an 8 mm. or 16 mm. projector with suitable minor change in the recorder as will appear. A movie film 14 is shown being unwound from the supply or wind-off reel 12 and passing through the projecting and film feed mechanism and being wound up on the take-up reel 13. The supply reel carrying the sound tape and the movie film could be mounted on the supply reel spindle of the projector or the spindle of the sound device, that is the reel 19 may serve as the supply reel for the movie film and the sound tape, however, it is preferred to mount it on the supply reel spindle of the movie projector. The projector has a driving motor 16.

A sound recorder and reproducer 17 has a magnetic recording tape 18 on which the desired sound is recorded. The sound recorder and reproducer has a reel 19 over which the recording tape passes as well as guides 20 which may be idler or guide pulleys. For normal operation the reel 19 may be substituted for a guide pulley, however, since a reel may be used here for recording, a reel is shown. Also the tape need not pass over or through this reel in passing to the sound head. The recording tape then passes over the recording and reproducing head 21 after which the tape passes over another guide 20 such as an idler or guide pulley. Suitable tape feed mechanism is provided, that shown being a driving wheel or pulley 22, usually rubber covered, over which the tape passes. The tape is then wound up on a take-up reel 23. The tape may be and it is desirable that it be a commercial tape which is one-quarter of an inch wide for 8 mm. or one-half inch wide for 16 mm. The reels for the sound tape are mounted on the case, so that they will be in planar or approximately planar alignment with the sound head and the supply reel of the movie projector located therebelow.

A pressure pad or head 26 bears against the tape and holds it in close contact with the recording head. It may be carried on a lever 27 pivotally mounted on the case on a pivot 28. A knob 29 carries a cam 30 which engages the level so as to raise the pressure head above the recording head for threading a tape therethrough. The reels and recording head are mounted upon a vertical panel 31 provided on the case. The reel or reels of the sound recorder are mounted in vertical position and in planar alignment or approximate alignment with the reels of a movie projector in the projector chamber in the case.

The driving wheel or capstan drive pulley 22, rubber covered, is mounted upon a shaft 34 which is journalled in a bearing on the panel 31. Any suitable driving connection is provided between a motor and the tape driving pulley 22. The driving connection shown includes a flywheel gear or pulley 35 also carried on the shaft 31. This gear or pulley is relatively heavy so that it serves also as a flywheel. A connecting pulley or gear 36 with a rubber cover contacts or meshes with the flywheel gear 35 and it in turn is driven such as by a pulley or gear 33 on the shaft of a motor 37. This drive connection is preferably a pulley train. The motor is disconnected from the flywheel 35 by raising the lever 27 which in turn raises a lever 38 on which the connecting pulley or gear 36 is carried and breaks driving connection between the gears or pulleys 36 and 35. This also raises the pressure head 26. A belt 39 carried on a pulley 40 connects the shaft 34 with the shaft 48 for the reel 23 to turn the reel and wind up the recording tape.

The sound reproduced from the magnetic tape 18 by the sound head is amplified by an amplifier 42 of any suitable circuit design and projected from a loud speaker 41 connected with the wire 43. The loud speaker may be mounted in the cabinet, preferably, however, it is plugged into a socket attached to the cabinet and the loud speaker placed adjacent to or in back of a film projection screen. The record is made on the magnetic tape by a microphone 44 which is plugged into the socket 45 and the electrical signal is amplified by an amplifier 42 and recorded on the tape with the recording head. The cabinet may be provided with a compartment 46 to contain the microphone and its cord when not in use. A knob 58 controls a rheostat in known manner for controlling the volume of sound to the loud speaker. A knob 59 is provided for control of the amplifier when recording on the tape. A knob 60 controls a 3-position 12-unit switch for making proper circuit connections for the recording of the sound on the tape or the reproducing or "play" of the sound recorded on the tape or to cut out the sound recorder and connect the microphone through the amplifier to the loud speaker. No erase circuit is provided so that there can be no accidental switching on of such a circuit and loss of the sound.

The cabinet also contains a single master switch 49 connected with a power plug 49a and with a socket 56 from which a cord 50 extends connecting the switch with the movie projector. A socket 57 is also connected with the master switch 49 and a cord 51 connects the same with the sound recorder. The projector and sound recorder and reproducer are connected with the power supply through this one master switch so that both begin to operate at the same time with their motors starting together. A lead-in cord 52 is plugged into a power socket to provide power at the switch and energize the sound recorder and the movie projector. A compartment 55 may be provided in the case for this cord. It is desirable also to have a light switch 53 at the case connected with a plug 53a and with a light in the room so that it is controllable from the case.

The driving pulley 22 for the magnetic recording tape has a peripheral speed to feed the sound recording tape at the same linear speed as the movie film of the movie projector used. An 8 mm. film projecting 16 frames a second moves at a speed of 2.4 inches per second and the recording tape is fed through the recording head at the same linear speed. This is a different speed than that at which commercial tape recorders run, however, it is fast enough for obtaining a good speech sound record and reasonably good for music. A 16 mm. movie film at 16 frames a second moves at a linear speed of 4.8 inches per second so that for a recorder and reproducer to be used with this larger film, the sound recording tape must move at this same speed of 4.8 inches per second. For a sound recorder and reproducer to be used with 16 mm. movie film and projector, the speed ratio between the motor pulley or gear and flywheel pulley or gear is changed to drive the tape driving pulley 22 at a speed to feed the tape at the same speed as the film or 4.8 inches per second. This speed may be secured by changing the pulley diameter ratio or gear ratio between the flywheel pulley or gear 35 and motor pulley, or gear 33. This is easily accomplished by putting a bushing or gear on the motor shaft of twice the diameter so that the bushing becomes the motor driving pulley or gear 33. A loose or sliding mounting for the connecting pulley or gear 36 will accommodate itself for these two sizes of driving pulley or gear. The reel spindles of the recorder reproducer will receive either an 8 mm. or 16 mm. reel. The sound head and tape guides 20 also will accommodate both widths of tape so that the only change necessary for conversion from 8 mm. to 16 mm. film is a change in the motor driving pulley.

The magnetic sound recording tape is wound with the movie film on the supply reel 12 of the movie projector. Since commercial magnetic tape as presently made is considerably thinner than the thickness of a movie film, approximately uniform feed of both the record tape and the movie film is secured by winding them together in superimposed relation. In other words, the end of the sound tape and the end of the film is retained or secured on the reel 12 and the two are wound thereon at the same time. The magnetic tape and the movie film may be mounted on a wide reel in side by side relation, however, to do this the record tape should have the same thickness as the film in order to assure uniform reeling on and reeling off of both the tape and film. This is not as advantageous as winding them in superimposed relation because the reel mounting shaft on the projector for the wind-off reel cannot be standard but must be longer to accommodate the wider reel. On the other hand, a longer film and sound record can be stored on the reel. If a thinner sound tape is used with a side to side relation, then a filler tape could be wound with the sound tape having a thckness so that the combined thickness of the sound tape and filler tape is the same as that of the movie film. This would be inconvenient, however, and not as practical.

Any slight variation in the speeds of the recording tape and film will accommodate itself in the combination by a small increase in loop or slackness developing in the tape or film. If, however, the sound record tape is running or feeding a little slower or faster than the movie film then the rheostat, or speed control 65 provided on the movie projector, can be turned to slow down or speed up, respectively, the speed of the movie projector and film sufficiently to correct for any small variation in speed which may occur between the two. An excessive difference in speed will manifest itself in either a relatively quickly developing slack or loop in the sound tape or a tightness in the sound tape and can be corrected by adjusting the speed control 65 of the projector.

The sound record may be made at the same time that the movies are being taken by making the sound or narrative as the camera takes the movie action, or it may be made later. In making a sound record after the film has been processed, the microphone 44 is connected with the socket 45 of the sound recorder and the movie film is run through the movie projector. As the film is shown on the screen, the sound, such as the narrative, is then recorded on the record tape. In this way the sound on the tape is synchronized with the film. The sound may be conversation alone or with background music, if desired, such as from a record, or music alone. The sound film has sufficient lead strip thereon so that it may be threaded through the sound recorder to and attached on the wind-up reel 19 just as the movie film has a lead strip which is threaded through the movie projector to and attached on its wind-up reel 13. For synchronized sound and film, the beginning of the sound on the tape or the end of the sound tape lead strip is located at the sound head 21 when threading the tape into the reproducer and the beginning of the film or the end of the film lead strip is located at the projector gate 61. Adjustment for synchronization can be made while operating. For example, suppose that the tape and the film are running at the same speed but the sound leads or lags the action on the film. By speeding up or slowing down respectively, the speed of the film for a brief period, the action is advanced or retarded until synchronization is secured after which the projector is returned to its original speed. For amateur and commercial sound movies, of course, precise synchronization is not necessary.

The case may have a side cover 54 to close the same and which can be opened for access to the projector and recorder-reproducer. The side cover preferably has securing means 64 by means of which it is removable. An inner surface on the cover may have a screen surface which is placed in front of the projector to provide a screen for the projection of the movie film. The case is constructed so that there will be no obstruction of projection with the projector in the case. A convenient form of cover is that particularly illustrated such that the edge of the case is located at a point where the case does not obstruct the projection of the film with the projector in operative position in the projector chamber and with the reels of the projector and sound recorder in substantial planar alignment. The reel 19 is used when it is desired to wind up the sound tape without the movie film.

Since the light and lamp for the projector is located beneath the sound tape, it is desirable to deflect the heat away from the tape. Any suitable deflecting means may be used. It is convenient to provide the deflector on the case and a deflecting plate 63 is shown carried by the case above the projector and between the latter and the tape.

This invention is presented to fill a need for improvements in a combination of movie projector and a magnetic tape sound recorder and reproducer. It is understood that various modifications in structure, as well as changes in mode of operation, assembly, and manner of use, may and often do occur to those skilled in the art, especially after benefiting from the teachings of the invention. Hence, it will be understood that this disclosure is illustrative of preferred means of embodying the invention in useful form by explaining the construction, operation and advantages thereof.

I claim:

1. A movie projector and magnetic tape sound recorder and reproducer combination comprising a case having an open side and a lower chamber; a movie projector located in the lower chamber having a lower take-up reel in a vertical plane, film feeding means, projection means, and a driving motor connected with the film feeding means and the take-up reel; an independent sound recorder and reproducer mounted above the movie projector having a vertically mounted sound head in planar alignment with the movie projector reel, a vertically mounted tape take-up reel in planar alignment with the sound head and the supply reel of the movie projector, and a sound tape drive means feeding the sound tape through the sound head at the same lineal speed as that of the movie film feeding at or approximately at the rate of 16 frames per second through the movie projector including a pulley having a peripherial speed the same as the speed of the movie film feeding means and a driving motor connected therewith and with the tape take-up reel; an upper supply reel mounted on one of the parts including the movie projector and the recorder reproducer in planar alignment with the sound head, and a movie film and a separate sound tape of the same length wound upon the supply reel.

2. A movie projector and magnetic tape sound recorder and reproducer combination as in claim 1 in which the movie film and sound tape are wound on the supply reel in superimposed relation and with their inner ends together.

3. A movie projector and magnetic tape sound recorder and reproducer combination as in claim 1 including a single master switch carried by the case and a pair of sockets connected with the master switch, one socket being connected with the movie projector and the other socket being connected with the sound recorder and reproducer.

4. A movie projector and magnetic tape sound recorder and reproducer combination comprising a case having an open side and a lower chamber; a movie projector of any standard manufacture removably located in the lower chamber having an upper supply reel in a vertical plane, film feeding means, projection means, a lower take-up reel and a driving motor connected with the film feeding means and the take-up reel; an independent sound recorder and reproducer mounted above the movie projector having a vertically mounted sound head in planar alignment with the movie projector reel, a vertically mounted tape take-up reel in planar alignment with the sound head and the supply reel of the movie projector, and a sound tape drive means feeding the sound tape through the sound head at the same lineal speed as that the movie film feeding at or approximately at the rate of 16 frames per second through the movie projector including a pulley having a peripherial speed the same as the speed of the movie film and a driving motor connected therewith; and a movie film and a separate sound tape wound upon the supply reel for the movie projector.

5. A movie projector and magnetic tape sound recorder and reproducer combination as in claim 4 in which the movie film and sound tape are wound on the supply reel in superimposed relation and with their inner ends together.

6. A movie projector and magnetic tape sound recorder and reproducer combination comprising a case having an open side and a lower chamber; a movie projector of any standard manufacture removably located in the lower chamber having a lower take-up reel, film feeding means, projection means and a driving motor connected with the film feed means and the take-up reel; an independent sound recorder and reproducer mounted above the movie projector having a vertically mounted sound head in planar alignment with the movie projector reel, a vertically mounted tape take-up reel in planar alignment with the sound head and the supply reel of the movie projector, and a sound tape drive means feeding the sound tape through the sound head at the same lineal speed of a movie film feeding at or approximately at the rate of 16 frames per second through the movie projector including a pulley having a peripherial speed the same as the speed of the movie film and a driving motor connected therewith; and an upper supply reel mounted on one of the parts including the movie projector and the sound recorder and reproducer.

7. A movie projector and magnetic tape sound recorder and reproducer combination as in claim 6 in which the movie projector has a supply reel spindle, and the supply reel for the tape and movie film is mounted on the supply reel spindle of the movie projector.

8. A magnetic tape sound recorder and reproducer adapted to be used in combination with a cooperating projector having film reels comprising a case having an open side and a chamber in the lower portion of the case of a size to receive a movie projector, an independent sound recorder and reproducer mounted in the case above the movie projector chamber having a vertically mounted sound head positioned to be in planar alignment with a reel on a movie projector in the movie projector chamber, an independent vertically mounted take-up reel for the sound tape mounted in the case in planar alignment with the sound head, and a sound tape drive means carried by the case for feeding a sound tape through the sound head and upon the take-up reel including a driving pulley in planar alignment with the sound head and having a peripherial speed the same as the lineal speed as that of a movie film feeding at or approximately at the rate of 16 frames per second through the cooperating movie projector, and an independent motor connected with the driving pulley and take-up reel.

9. A magnetic tape sound recorder and reproducer as in claim 8 including a single master switch carried by the case and connected with the sound recorder and reproducer, and a socket connected with the switch to receive a cord of a movie projector.

10. A magnetic tape sound recorder and reproducer as in claim 8 in which the take-up reel is positioned adjacent the rear wall of the case.

11. A magnetic tape sound recorder and reproducer as in claim 8 having a supply reel mounted above the chamber and adjacent the front wall of the case to be approximately above a reel of a movie projector in the chamber.

12. A magnetic tape sound recorder and reproducer adapted to be used in combination with a cooperating projector having film reels comprising a case having an open side, a chamber in the lower portion of the case of a size to receive a movie projector; an independent sound recorder and reproducer mounted in the case above the movie projector chamber having a vertically mounted sound head positioned to be in planar alignment with a reel on a movie projector in the movie projector chamber, an independent vertically mounted take-up reel for the sound tape within the case in planar alignment with the sound head, and a sound tape drive means carried by the case for feeding a sound tape through the sound head and upon the take-up reel including a drive pulley in planar alignment with the sound head and having a peripherial speed the same as the lineal speed of a movie film feeding at or approximately at the rate of 16 frames per second through a cooperating movie projector, and an independent motor connected with the drive pulley; the edge of the open side of the case being spaced from the plane of the reel and sound head whereby projection is unobstructed by the wall of the case from a projector in the projection chamber, and a cover closing the open side.

References Cited in the file of this patent

UNITED STATES PATENTS

| | | |
|---|---|---|
| 1,843,972 | De Forest | Feb. 9, 1932 |
| 1,845,236 | Chipman | Feb. 16, 1932 |
| 1,866,712 | Jones | July 12, 1932 |
| 2,369,786 | Kuhlik | Feb. 20, 1945 |
| 2,567,086 | Stoltz | Sept. 4, 1951 |
| 2,782,677 | Steigman | Feb. 26, 1957 |

FOREIGN PATENTS

| | | |
|---|---|---|
| 891,653 | France | Dec. 11, 1943 |
| 1,029,201 | France | Mar. 4, 1953 |
| 921,127 | Germany | Dec. 9, 1954 |